(12) United States Patent
Liu et al.

(10) Patent No.: US 12,471,674 B2
(45) Date of Patent: Nov. 18, 2025

(54) WATERPROOF UPPER COMPONENTS OF SHOES, AND METHODS OF MAKING WATERPROOF SHOES AND WATERPROOF UPPER COMPONENTS THEREOF

(71) Applicant: Cosmostar USA LLC, Byfield, MA (US)

(72) Inventors: Bi Qiang Liu, Hu Han (CN); Josh VanDerNoot, Boston, MA (US); Fajun Xu, Shan Dong (CN); Hai Xu, Guang Dong (CN)

(73) Assignee: Cosmostar USA LLC, Byfield, MA (US)

( * ) Notice: Subject to any disclaimer, the term of this patent is extended or adjusted under 35 U.S.C. 154(b) by 29 days.

(21) Appl. No.: 18/515,718

(22) Filed: Nov. 21, 2023

(65) Prior Publication Data

US 2024/0164482 A1     May 23, 2024

Related U.S. Application Data

(60) Provisional application No. 63/384,832, filed on Nov. 23, 2022.

(51) Int. Cl.
  *A43B 23/02*     (2006.01)
  *A43D 8/06*      (2006.01)
  *A43D 25/20*     (2006.01)

(52) U.S. Cl.
  CPC ........ *A43B 23/0235* (2013.01); *A43B 23/021* (2013.01); *A43B 23/0215* (2013.01); *A43B 23/025* (2013.01); *A43B 23/0255* (2013.01); *A43D 8/06* (2013.01); *A43D 25/20* (2013.01)

(58) Field of Classification Search
  CPC .............. A43B 23/0235; A43B 23/022; A43B 23/0225

USPC ............................................................ 36/55
See application file for complete search history.

(56) References Cited

U.S. PATENT DOCUMENTS

| | | | |
|---|---|---|---|
| 4,599,810 A * | 7/1986 | Sacre ................. | A43B 23/0255 36/83 |
| 2007/0199210 A1 | 8/2007 | Vattes et al. | |
| 2013/0232818 A1* | 9/2013 | Wiener ................. | A43B 7/125 36/102 |
| 2016/0007675 A1 | 1/2016 | Bier et al. | |
| 2018/0035756 A1* | 2/2018 | Lin ...................... | A43B 23/026 |
| 2018/0228246 A1 | 8/2018 | Polegato Moretti et al. | |
| 2019/0223545 A1 | 7/2019 | Chang et al. | |
| 2022/0400807 A1* | 12/2022 | Bauer ..................... | B32B 27/16 |

FOREIGN PATENT DOCUMENTS

CN            205848851 U      1/2017

OTHER PUBLICATIONS

International Search Report and Written Opinion of the International Searching Authority dated Mar. 15, 2024 from corresponding International Application No. PCT/US2023/080657.
"The Gore-Tex Product Range: Gore-Tex Invisible Fit Footwear", retrieved from the Internet: https://www.gore-tex.com/technology/gore-tex-products/invisible-fit-footwear [copy retrieved Dec. 18, 2023], 7 pages.

* cited by examiner

*Primary Examiner* — Timothy K Trieu
(74) *Attorney, Agent, or Firm* — Pierce Atwood LLP; Christopher A. Baxter

(57) ABSTRACT

Waterproof upper components of shoes, and methods of making waterproof shoes and waterproof upper components thereof are described.

30 Claims, 11 Drawing Sheets

WATERPROOF UPPER COMPONENTS OF SHOES, AND METHODS OF MAKING WATERPROOF SHOES AND WATERPROOF UPPER COMPONENTS THEREOF

RELATED APPLICATION

The present application claims the benefit under 35 U.S.C. § 119 (e) to U.S. Provisional Application No. 63/384,832 filed on Nov. 23, 2022, the contents of which are incorporated by reference herein in their entirety.

FIELD

The present disclosure relates to waterproof upper components of shoes, and methods of making waterproof shoes and waterproof upper components thereof.

BACKGROUND

Certain methods of making waterproof shoes utilize waterproof booties. The waterproof booty is made into the shape of an interior of a shoe such that a wearer's foot can be placed within the waterproof booty. In making the waterproof shoe, the waterproof booty is stitched to a non-waterproof upper component of the shoe, and then the outsole is assembled.

SUMMARY

The present disclosure relates to waterproof upper components of shoes, and methods of making waterproof shoes using the waterproof upper components such that waterproof booties need not be utilized.

A first aspect of the present disclosure relates to a method for making a waterproof upper component of a shoe, the method comprising cutting the waterproof upper component from a layered waterproof material having a minimum of three layers, the layered waterproof material comprising a waterproof layer positioned between and attached to a layer of mesh and a layer of textile.

In some embodiments of the first aspect, the layer of mesh is pre-treated with a water repellant.

In some embodiments of the first aspect, the layer of mesh comprises non-wicking mesh.

In some embodiments of the first aspect, the layer of textile comprises knitted fabric.

In some embodiments of the first aspect, the knitted fabric comprises nylon, wool, rayon, silk, cotton, polyester, or a combination thereof.

In some embodiments of the first aspect, the knitted fabric comprises non-wicking knitted fabric.

In some embodiments of the first aspect, the layer of textile comprises a leather, a synthetic leather, or a combination thereof.

In some embodiments of the first aspect, cutting the waterproof upper component from the layered waterproof material comprises die cutting the layered waterproof material.

A second aspect of the present disclosure relates to a method for making a waterproof upper component of a shoe, the method comprising: providing a layered material having the shape of an upper component of a shoe, the layered material comprising a waterproof layer having two sides, wherein a first side of the waterproof layer is attached to a layer of textile, and the second side of the waterproof layer has an adhesive applied thereto; providing a layer of mesh having the shape of an upper component of a shoe; and obtaining the waterproof upper component by attaching the layer of mesh to the layered material using the adhesive.

In some embodiments of the second aspect, the layer of textile comprises knitted fabric.

In some embodiments of the second aspect, the knitted fabric comprises nylon, wool, rayon, silk, cotton, polyester, or a combination thereof.

In some embodiments of the second aspect, the knitted fabric comprises non-wicking knitted fabric.

In some embodiments of the second aspect, the layer of textile comprises a leather, a synthetic leather, or a combination thereof.

In some embodiments of the second aspect, the layer of mesh is pre-treated with a water repellant.

In some embodiments of the second aspect, the layer of mesh comprises non-wicking mesh.

In some embodiments of the second aspect, the adhesive is a heat-activated adhesive, and obtaining the waterproof upper component comprises hot pressing the layered material to the layer of mesh.

A third aspect of the present disclosure relates to a method for making a waterproof shoe, the method comprising: providing a waterproof upper component comprising a waterproof layer positioned between and attached to a layer of mesh and a layer of textile, the waterproof upper component comprising first and second heel portions; coupling a tongue to the waterproof upper component; coupling the first and second heel portions, of the waterproof upper component, together; after coupling the first and second heel portions together, coupling a collar lining to the waterproof upper component; after coupling the first and second heel portions together, coupling a waterproof gasket to a bottom portion of the waterproof upper component; and after coupling the waterproof gasket to the bottom portion of the waterproof upper component, coupling an outsole to at least one of the waterproof gasket and the waterproof upper component.

In some embodiments of the third aspect, the layer of mesh, of the waterproof upper component, is pre-treated with a water repellant.

In some embodiments of the third aspect, the layer of mesh, of the waterproof upper component, comprises non-wicking mesh.

In some embodiments of the third aspect, the layer of textile, of the waterproof upper component, comprises knitted fabric.

In some embodiments of the third aspect, the knitted fabric comprises nylon, wool, rayon, silk, cotton, polyester, or a combination thereof.

In some embodiments of the third aspect, the knitted fabric comprises non-wicking knitted fabric.

In some embodiments of the third aspect, the layer of textile, of the waterproof upper component, comprises a leather, a synthetic leather, or a combination thereof.

In some embodiments of the third aspect, the method comprises, prior to coupling the first and second heel portions together, coupling a decorative material to the layer of mesh of the waterproof upper component.

In some embodiments of the third aspect, the decorative material comprises thermoplastic polyurethane (TPU) fabric.

In some embodiments of the third aspect, the decorative material is coupled to the layer of mesh using an adhesive.

In some embodiments of the third aspect, the adhesive is a heat-activated adhesive, and coupling the decorative material to the layer of mesh comprises hot pressing the decorative material to the layer of mesh.

In some embodiments of the third aspect, the decorative material is coupled to the layer of mesh using stitching, and the method comprises placing seam sealing tape on the layer of textile, of the waterproof upper component, to cover stitching on an inner side of the waterproof upper component.

In some embodiments of the third aspect, coupling the tongue to the waterproof upper component comprises use of stitching.

In some embodiments of the third aspect, the method comprises using a waterproof material to cover the stitching used to couple the tongue to the waterproof upper component, wherein the waterproof material is applied to an inner side of the waterproof upper component.

In some embodiments of the third aspect, the waterproof material comprises a waterproof layer having two sides, wherein a first side of the waterproof layer is coupled to a layer of mesh, and the second side of the waterproof layer has an adhesive applied thereto.

In some embodiments of the third aspect, the adhesive is a heat-activated adhesive, and using the waterproof material comprises hot pressing the waterproof material to the inner side of the waterproof upper component.

In some embodiments of the third aspect, the method comprises applying seam sealing tape to cover the stitching used to couple the tongue to the waterproof upper component, wherein the seam sealing tape is applied to an inner side of the waterproof upper component.

In some embodiments of the third aspect, the method comprises applying a vamp lining to an inner surface of the waterproof upper component.

In some embodiments of the third aspect, the vamp lining is applied prior to coupling the first and second heel portions together.

In some embodiments of the third aspect, the vamp lining comprises mesh, synthetic leather, or a combination thereof.

In some embodiments of the third aspect, the vamp lining does not extend to a bottom edge of the waterproof upper component, thereby enabling a bottom portion, of the waterproof upper component, to be coupled to the waterproof gasket.

In some embodiments of the third aspect, the vamp lining is positioned at least 10 mm away from the bottom edge of the waterproof upper component.

In some embodiments of the third aspect, coupling the first and second heel portions, of the waterproof upper component, together occurs after coupling the tongue to the waterproof upper component.

In some embodiments of the third aspect, coupling the first and second heel portions, of the waterproof upper component, together comprises use of stitching.

In some embodiments of the third aspect, the method comprises applying seam sealing tape to cover the stitching used to couple the first and second heel portions of the waterproof upper component, together, wherein the seam sealing tape is applied to an inner side of the waterproof upper component.

In some embodiments of the third aspect, the waterproof gasket comprises a layer of non-woven material and a waterproof layer, the layer of non-woven material faces an inner portion of the waterproof upper component, and coupling the waterproof gasket to the bottom portion of the waterproof upper component comprises coupling the layer of textile, of the waterproof upper component, to the waterproof layer of the waterproof gasket.

In some embodiments of the third aspect, coupling the waterproof gasket to the bottom portion of the waterproof upper component occurs after coupling the collar lining to the waterproof upper component.

In some embodiments of the third aspect, coupling the waterproof gasket to the bottom portion of the waterproof upper component comprises use of an adhesive.

In some embodiments of the third aspect, the adhesive is a heat-activated adhesive.

In some embodiments of the third aspect, coupling the waterproof gasket to the bottom portion of the waterproof upper component comprises use of a lasting machine.

A fourth aspect of the present disclosure relates to a waterproof upper component of a shoe, comprising a layered waterproof material having a minimum of three layers, the layered waterproof material comprising a waterproof layer positioned between and attached to a layer of mesh and a layer of textile.

In some embodiments of the fourth aspect, the layer of mesh is pre-treated with a water repellant.

In some embodiments of the fourth aspect, the layer of mesh comprises non-wicking mesh.

In some embodiments of the fourth aspect, the layer of textile comprises knitted fabric.

In some embodiments of the fourth aspect, the knitted fabric comprises nylon, wool, rayon, silk, cotton, polyester, or a combination thereof.

In some embodiments of the fourth aspect, the knitted fabric comprises non-wicking knitted fabric.

In some embodiments of the fourth aspect, the layer of textile, of the waterproof upper component, comprises a leather, a synthetic leather, or a combination thereof.

In some embodiments of the fourth aspect, the layered waterproof material is laminated.

In some embodiments of the fourth aspect, the waterproof layer is attached to the layer of mesh using an adhesive.

In some embodiments of the fourth aspect, the adhesive is a heat-activated adhesive.

DETAILED DESCRIPTION

The present disclosure provides waterproof upper components of shoes, and methods for making waterproof shoes and waterproof upper components thereof. As used herein, an "upper component" of a shoe refers to the entire part of the shoe above the gasket and sole. An upper component may include various subcomponents including, for example, a toe, a vamp, a tongue, a collar, eyelets, eyestays, a shoelace, a quarter, a counter, and a lining. The toe is the material forming the front-most part of the shoe upper component. The vamp is the front part of the upper component starting behind the toe and extending towards the back of the upper component. The tongue generally refers to the part of the upper component positioned between the lower part of the shoelace and the upper part of the instep. The collar is the top edge of the upper component where the foot is inserted. Eyelets are the holes where laces are inserted through, and eyestays are reinforcement pieces under eyelets. The quarter is the back part of the upper component that typically begins where the vamp ends and wraps around the heel. The counter is material forming the back of the upper component and which gives support and stiffens the material around the heel to help maintain the shape of the upper component. Lastly, the lining is a layer of material on the inside of the shoe upper component to provide comfort to the wearer.

Waterproof Upper Components and Methods of Making Same

The present disclosure provides first and second methods for making waterproof upper components of shoes.

Figure 1:
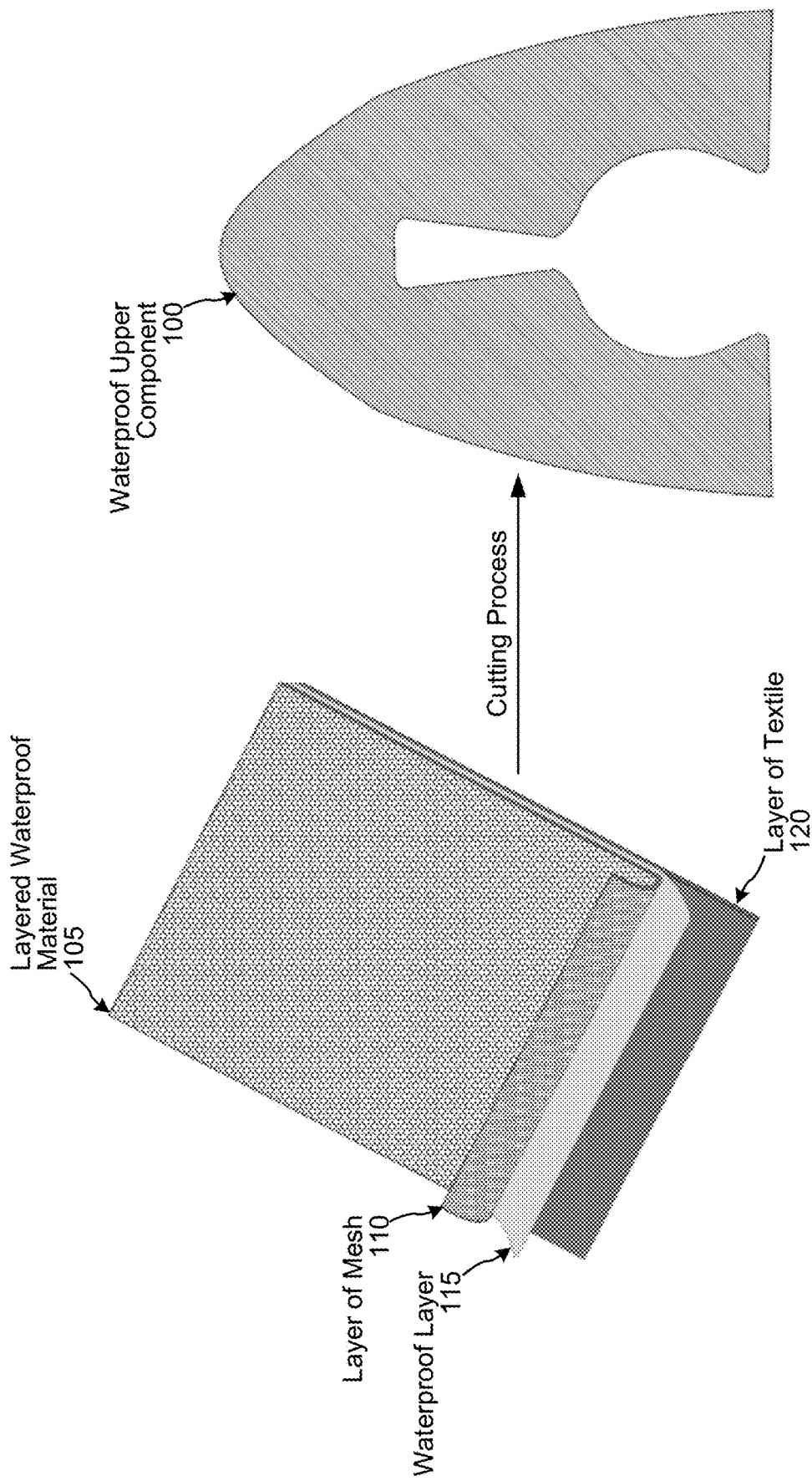
FIG. 1 illustrates production of a waterproof upper component from a layered waterproof material. The left side of FIG. 1 is a perspective view of the layered waterproof material, and the right side of FIG. 1 is a top-planar view of the waterproof upper component.

In a first method of making a waterproof upper component 100, the waterproof upper component 100 is cut from a layered waterproof material 105, as illustrated in FIG. 1. The layered waterproof material 105 may be cut into the structure of a planar waterproof upper component 100 using various cutting techniques. The present disclosure is not limited to any particular technique for cutting the layered waterproof material 105 into the waterproof upper component 100. In some embodiments, the layered waterproof material 105 may undergo die cutting to produce the waterproof upper component 100.

As illustrated in FIG. 1, the layered waterproof material 105 may include at least a layer of mesh 110, a waterproof layer 115, and a layer of textile 120. While the layered waterproof material 105 is illustrated as having three layers, the present disclosure envisions the layered waterproof material 105 as including at least the three layers illustrated in FIG. 1.

The layered waterproof material 105 may be configured such that the waterproof layer 115 is positioned between and attached, either directly or indirectly, to each of the layer of mesh 110 and the layer of textile 120 (i.e., the layer of mesh 110 is attached, either directly or indirectly to a first side/surface of the waterproof layer 115, and the layer of textile 120 is attached, either directly or indirectly, to a second side/surface of the waterproof layer 115). In some embodiments, the layered waterproof material 105 may be a laminated material, meaning the layer of mesh 110, the waterproof layer 115, and the layer of textile 120 are fused together as a function of heat and pressure applied during a lamination process.

As used herein, "mesh" refers to an interlaced material made of a network of wire and/or thread. The layer of mesh 105 is not to be construed in a limiting fashion. Rather, it is envisioned that the layer of mesh 105 may include one or more individual layers of mesh, and may include one or more types of mesh.

For example, the layer of mesh 105 may include polyester mesh made using polyester fibers. Polyester mesh is generally available in a range of colors, and provides rather high breathability and moisture-wicking. Polyester mesh is often, but not exclusively, used when making athletic shoes.

For further example, the layer of mesh 105 may include nylon mesh made using synthetic polyamide fibers. Nylon mesh is known to have a soft feel, high tensile strength, and dust resistance, making it useful in sports shoes, among other types of shoes.

As another example, the layer of mesh 105 may include power mesh. Typically, power mesh is made using a blend of nylon and spandex (i.e., a synthetic polyether-polyurea copolymer).

As a further example, the layer of mesh 105 may include air mesh. Air mesh, sometimes referred to as 3D mesh or spacer knitwear, is a multi-layer mesh that can be made using polyester, nylon, or a combination thereof.

The layer of mesh 105 may be non-wicking mesh, or may include non-wicking mesh. As used herein, a "non-wicking mesh" refers to a mesh in which a first end thereof may be placed within 10 mm of water, and the water absorption height does not exceed 10 mm after 6 hours.

The layer of mesh 105 may, in some embodiments, be pre-treated with a water repellant. Water repellants for use in manufacturing shoes are within the knowledge of one skilled in the art. Illustrative examples of water repellants that may be pre-treated onto the layer of mesh 105 include, but are not limited to, C0- and C6-based fluorocarbon water repellant compositions.

The waterproof layer 115 may be made of or otherwise include any material capable of being used in a shoe manufacturing process and which provides waterproofing to the upper component of the resulting shoe. For example, the waterproof layer 115 may be or include polyurethane, thermoplastic polyurethane, polyester, polytetrafluoroethylene, polyamide, or a combination of any two or more thereof.

The layer of textile 120 is not to be construed in a limiting fashion. Rather, it is envisioned that the layer of textile 120 may include one or more individual layers of textile, and may include one or more types of textile. In some embodiments, the layer of textile 120 may be or include nylon tricot.

The layer of textile 120 may include a knitted fabric and/or a woven fabric. Knitting involves bending material into yarn (i.e., a coil), and setting multiple yarns with each other to form fabric. The process of forming a coil of yarn can be carried out horizontally or vertically. Transverse knitting is called weft knitting, and longitudinal knitting is called warp knitting. A non-limiting list of knitted fabrics includes those made using nylon, wool, rayon, silk, cotton, polyester, or a combination of any two or more thereof. In some embodiments, the layer of textile 120 may include tricot, a knitted fabric with a close inelastic knit.

Weaving involves interweaving two or more groups of vertical yarns with warp and weft knits at a 90 degree angle. The longitudinal yarn is called warp yarn, and the transverse yarn is called weft yarn.

In some embodiments, the layer of textile 120 may include or be a knitted fabric.

In some embodiments, the layer of textile 120 may include a non-wicking knitted or woven fabric. In this context, a "non-wicking" knitted or woven fabric is a knitted or woven fabric in which a first end thereof may be placed within 10 mm of water, and the water absorption height does not exceed 10 mm after 6 hours.

In some embodiments, the layer of textile 120 may be or include leather, synthetic leather, or a combination thereof.

Figure 2:
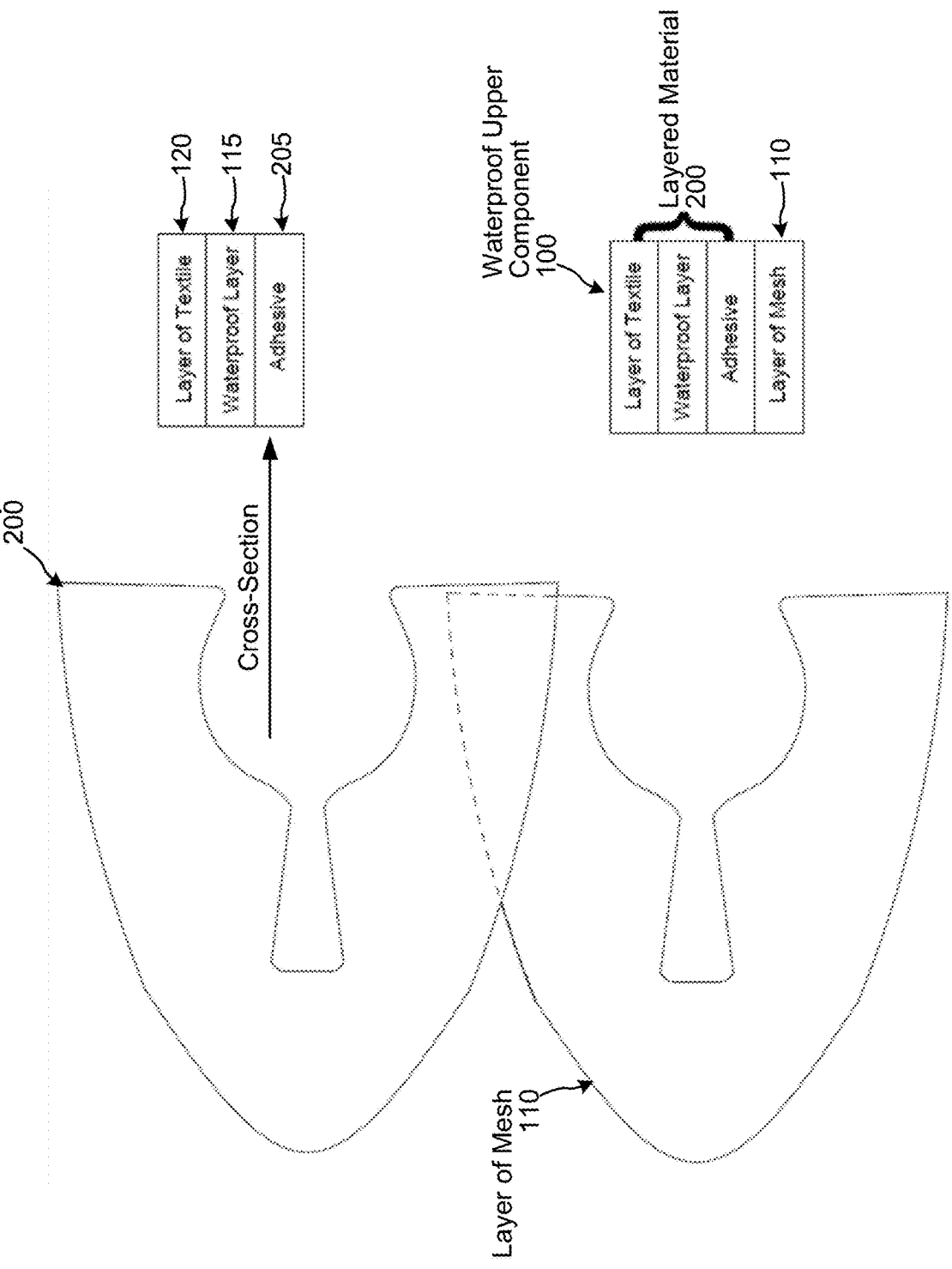
FIG. 2 illustrates production of a waterproof upper component from a layered material and a layer of mesh. The top-left portion of FIG. 2 is a top-planar view of the layered component. The top-right portion of FIG. 2 is a cross-section view of the layered component. The bottom-left portion of FIG. 2 is a top-planar view of the layer of mesh with a portion thereof shown in phantom. The bottom-right portion of FIG. 2 is a cross-section view of the waterproof upper component produced from the layered material and the layer of mesh.

With reference to FIG. 2, a second method of making the waterproof upper component 100 includes producing the waterproof upper component 100 from a layered material 200 and the layer of mesh 110. Both the layered material 200 and the layer of mesh 110 may be individually cut into the shape of a planar waterproof upper component 100 using various cutting techniques. The present disclosure is not limited to any particular technique for cutting the layered material 200 and the layer of mesh 110 into the shape of an upper component. In some embodiments, the layered material 200 and/or the layer of mesh 110 may be produced by die cutting.

The layered material 200 includes at least the waterproof layer 115 and the layer of textile 120.

The waterproof layer 115 includes two side/surfaces. The first side of the waterproof layer 115 may be attached, either directly or indirectly, to the layer of textile 120. The layer of textile 120 may be attached to the first side of the waterproof layer 115 in a variety of ways. In some embodiments, the layer of textile 120 may be laminated onto the first side of the waterproof layer 115. In other words, the layer of textile 120 may be fused to the first side of the waterproof layer 115 as a function of heat and pressure applied during a lamination process.

A second side of the waterproof layer 220 may have an adhesive 205 applied thereto. The adhesive 205 may be any adhesive capable of adhering to the second side of the waterproof layer 115 and the layer of mesh 110. In some embodiments, the adhesive 205 may be a heat-activated adhesive.

After obtaining or providing the layered material 200 and the layer of mesh 110, each in the shape of an upper component of a shoe, the waterproof upper component 100 may be obtained by attaching the layer of mesh 110 to the layered material 200, and more particularly the waterproof layer 115 of the layered material 200, using the adhesive 205. In embodiments where the adhesive 205 is a heat-activated adhesive, the waterproof upper component 100 may be obtained by hot pressing the layered material 200 to the layer of mesh 110, such that the heat-activated adhesive becomes thermally active and adheres to both the layer of mesh 110 and the waterproof layer 115.

Method of Making Waterproof Shoe

Figure 3:
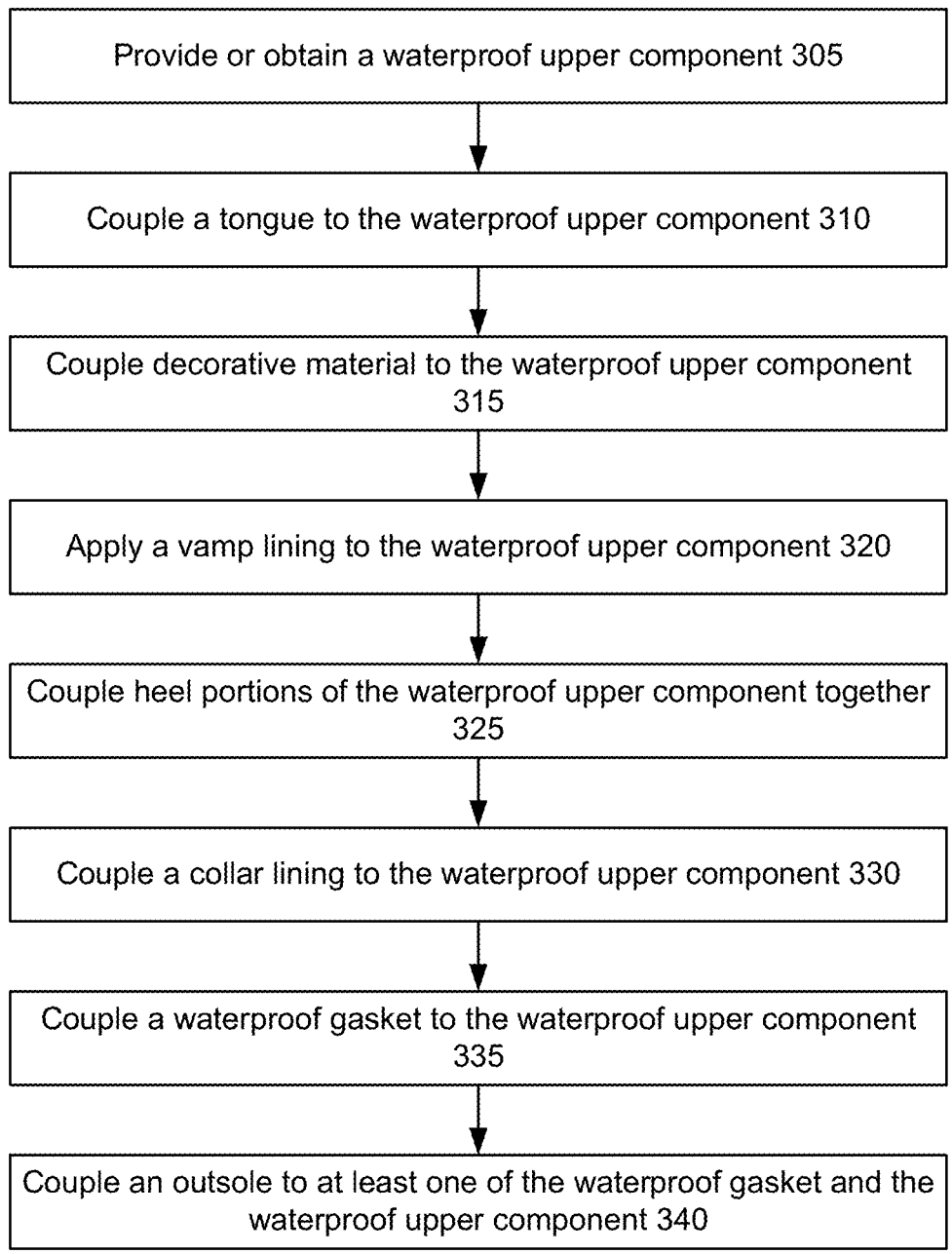
FIG. 3 is a process flow diagram illustrating a method for making a waterproof shoe using a waterproof upper component.

The present disclosure also provides for methods of making waterproof shoes using the waterproof upper component 100. FIG. 3 provides an example method starting with providing or obtaining (step 305) the waterproof upper component 100.

The method includes coupling (step 310) a tongue to the waterproof upper component 100. Examples of how the tongue may be coupled to the waterproof upper component 100, while maintaining a waterproof integrity of the waterproof upper component 100, are described in detail herein below with respect to FIGS. 6 and 7.

In some embodiments, the method may include coupling (step 315) one or more decorative materials to the waterproof upper component 100. The decorative material(s) may be coupled to the waterproof upper component 100 anytime prior to coupling heel portions of the waterproof component 100 together. Examples of how the decorative material(s) may be coupled to the waterproof upper component 100, while maintaining a waterproof integrity of the waterproof upper component 100, are described in detail herein below with respect to FIGS. 4 and 5.

The method may include applying (step 320) a vamp lining to the waterproof upper component 100. The vamp lining may be coupled to the waterproof upper component 100 anytime prior to coupling heel portions of the waterproof component 100 together. Examples of how the vamp lining may be coupled to the waterproof upper component 100, while maintaining a waterproof integrity of the waterproof upper component 100, are described in detail herein below with respect to FIG. 8.

The method may include coupling (step 325) heel portions of the waterproof upper component 100 together. An example of how to couple the heel portion together, while maintaining a waterproof integrity of the waterproof upper component 100, is described in detail herein below with respect to FIG. 9.

The method may include, after coupling the heel portions together, coupling (step 325) a collar lining the waterproof upper component 100 together. An example of how to couple the collar lining to the waterproof upper component 100, while maintaining a waterproof integrity of the waterproof upper component 100, is described in detail herein below with respect to FIG. 10.

The method may include coupling (step 335) a waterproof gasket to the waterproof upper component 100. An example of how to couple the waterproof gasket to the waterproof upper component 100, while maintaining a waterproof integrity of the waterproof upper component 100, is described in detail herein below with respect to FIG. 11.

The method may include coupling (step 340) an outsole to at least one of the waterproof gasket and the waterproof upper component 100. Details of how to couple the outsole to the waterproof gasket and/or the waterproof upper component 100, while maintaining a waterproof integrity of the waterproof upper component 100 and waterproof gasket, are provided herein below.

Attaching Decorative Material to Waterproof Upper Component

Figure 4:
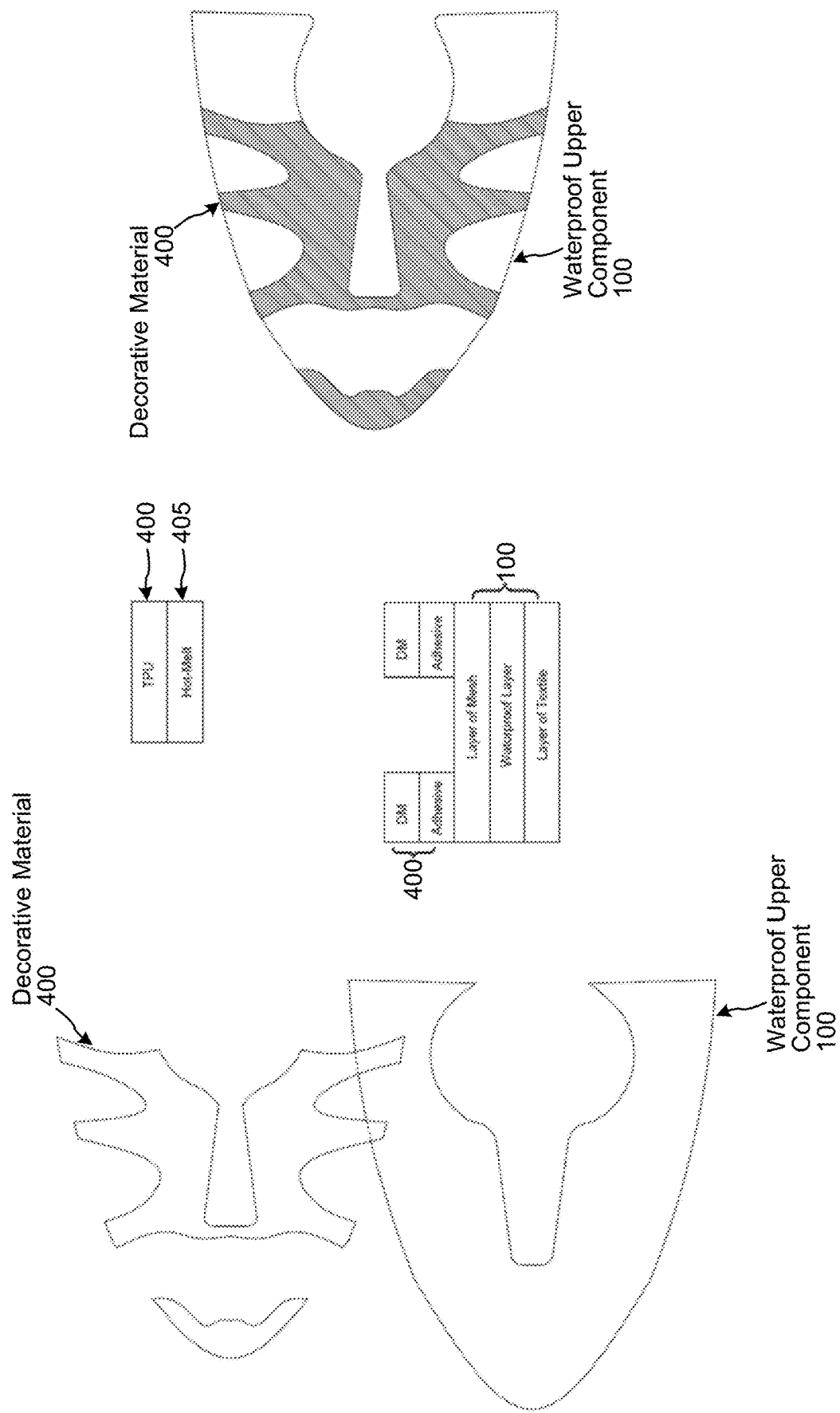
FIG. 4 illustrates a first technique for attaching decorative material to a waterproof upper component. The top-left of FIG. 4 is a top-planar view of the decorative material. The top-middle of FIG. 4 is a cross-section view of the decorative material having an adhesive applied thereto. The bottom-left of FIG. 4 is a top-planar view of the waterproof upper component with portions occluded by the decorative material shown in phantom. The bottom-middle of FIG. 4 is a cross-section view of the waterproof upper component having the decorative material attached thereto. The right of FIG. 4 is a top-planar view of the waterproof upper component having the decorative material attached thereto.

Referring to FIG. 4, after the waterproof upper component 100 is provided or obtained, one or more pieces of decorative material 400 may be applied to the waterproof upper component 100. The present disclosure is not intended to be limited to any particular material(s), shape(s), and/or size(s) of decorative material 400. Any decorative material known to one skilled in the art or not yet discovered is within the scope of the present disclosure. Notwithstanding, example decorative materials include thermoplastic polyurethane (TPU) fabric, print (including 3D print), micro injection (e.g., of polyvinyl chloride, rubber, or polyurethane), heat cutting, and stitching.

In order to maintain the waterproof integrity of the waterproof upper component 100, in some embodiments the decorative material 400 may be applied to the waterproof upper component 100 using an adhesive 405. For example, the decorative material 400 may have a first side/surface and a second/side surface. The first side/surface may have the adhesive 405 applied thereto. The adhesive 405 may be any adhesive capable of adhering to the first side of the decorative material 400 and the waterproof upper component 100, and more particularly the layer of mesh 110 of the waterproof upper component 100. In some embodiments, the adhesive 405 may be a heat-activated adhesive. In embodiments where the adhesive 405 is a heat-activated adhesive, hot pressing may be used to thermally activate and adhere the heat-activated adhesive to both the decorative material 400 and the waterproof upper component 100, and more particularly the layer of mesh 110 thereof.

Figure 5:
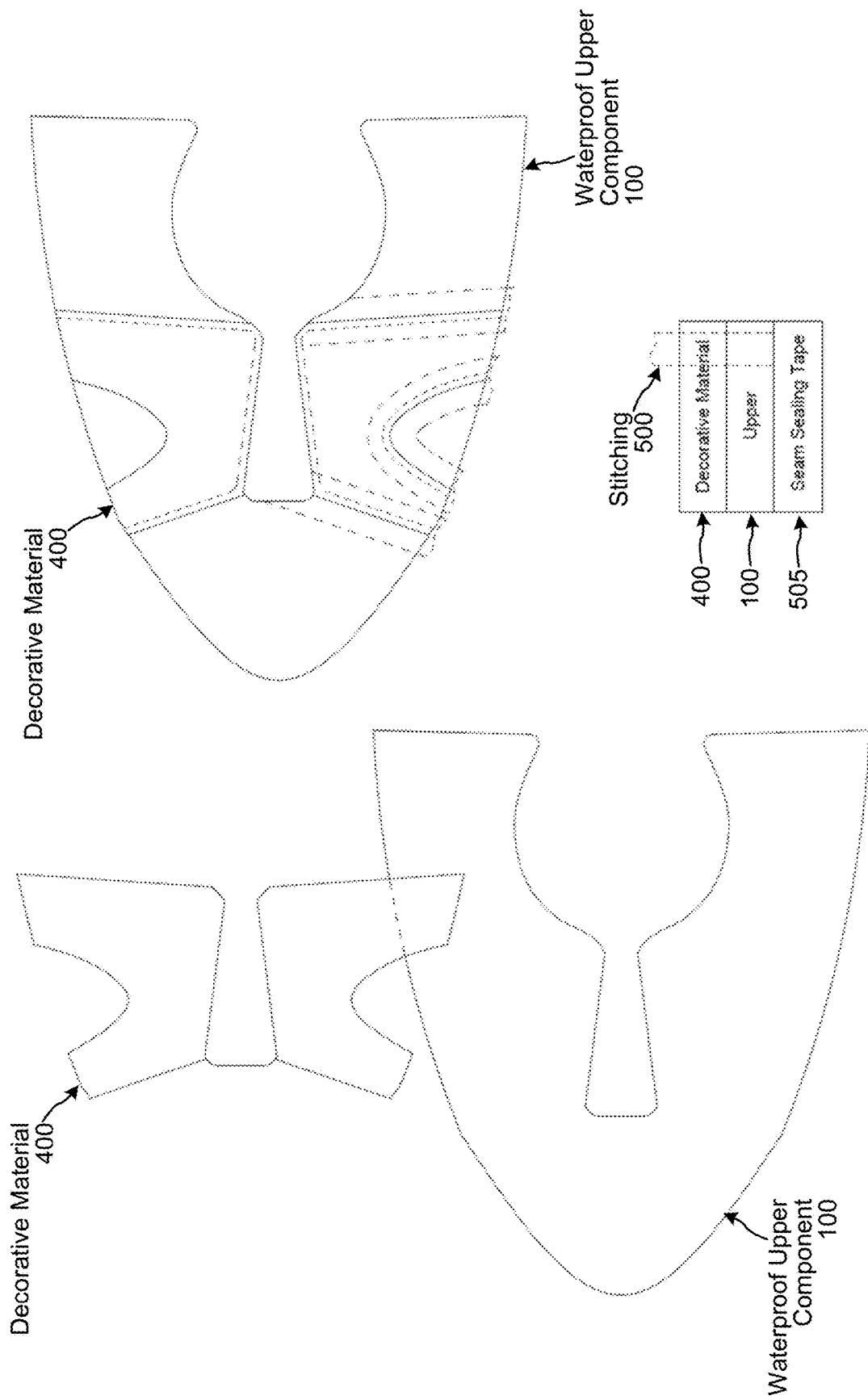
FIG. 5 illustrates a second technique for attaching decorative material to a waterproof upper component. The top-left of FIG. 5 is a top-planar view of the decorative material. The bottom-left of FIG. 5 is a top-planar view of the waterproof upper component. The top-right of FIG. 5 is a top-planar view of the waterproof upper component having the decorative material attached thereto. The bottom-right of FIG. 5 is a cross-section view of the waterproof upper component having the decorative material attached thereto.

FIG. 5 provides an alternative technique for attaching the decorative material 400 to the waterproof upper component 100. Referring to FIG. 5, after the waterproof upper component 100 is provided or obtained, one or more pieces of decorative material 400 may be applied to the waterproof upper component 100, and more particularly the layer of mesh 110 thereof, using stitching 500. The stitching 500 may be used to attach edges of the decorative material 400 to the waterproof upper component 100, as illustrated in FIG. 5. Additionally or alternatively, stitching may be used at inner portions of the decorative material 400.

As illustrated in FIG. 5, the stitching 500 may go through an entirety of the waterproof upper component 100 and, as such, may puncture the waterproof layer 115 of the waterproof upper component 100. Puncturing of the waterproof layer 115, regardless of the extent of puncture, may result in compromised waterproofing of the waterproof upper component 100. To restore/maintain the waterproof integrity of the waterproof upper component 100, seam sealing tape 505 may be applied to the inner surface of the waterproof upper component 100, that is the surface of the waterproof upper component 100 positioned distally from the decorative material 400 (e.g., the layer of textile 120 of the waterproof upper component 100). The seam sealing tape 505 may be strategically placed to cover the stitching that is exposed on the inner side of the waterproof upper component 100 (i.e., the surface of the waterproof upper component 100 distal from the decorative material 400).

In at least some embodiments, the decorative material 400 may be attached to the waterproof upper component 100 prior to coupling heel portions, of the waterproof upper component 100, together.

Attaching Tongue to Waterproof Upper Component

The present disclosure further provides techniques for attaching a tongue to the waterproof upper component 100 while maintaining the waterproof integrity of the waterproof upper component 100.

Figure 6:
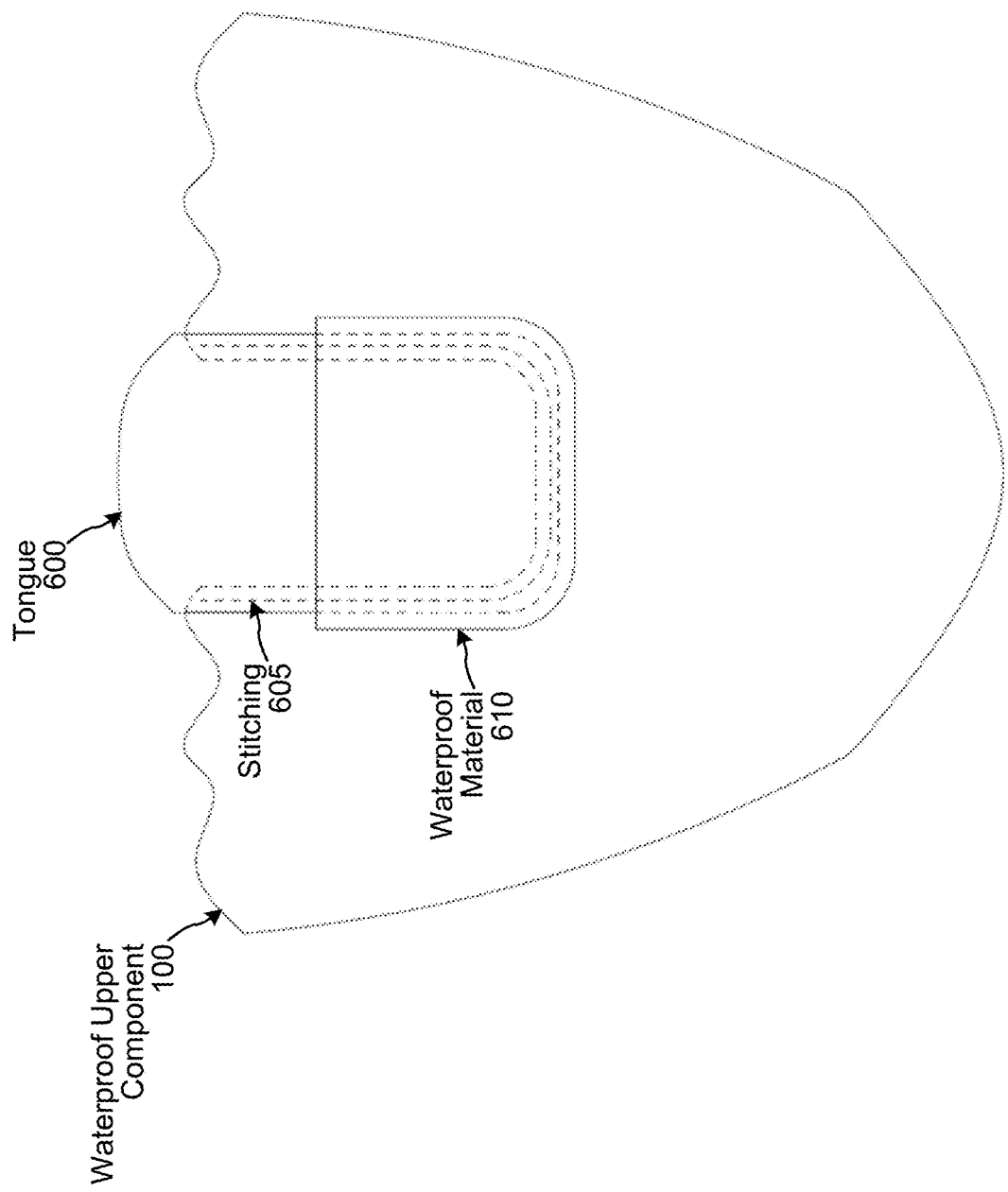
FIG. 6 is a top-planar view of a tongue coupled to a waterproof upper component using stitching, where waterproofing of the upper component is maintained using a waterproof material.

As noted herein above, the tongue is a component of a shoe that is positioned between the lower part of the shoelace and the upper part of the instep. FIG. 6 shows a toe and partial portion of the vamp of the waterproof upper component 100 having a tongue 600 attached thereto using stitching 605. As illustrated, the stitching 605 may be used along an entirety of a bottom edge of the tongue 600, and at least partially along side edges of the tongue 600. However, the present disclosure is not limited thereto. For example, the stitching 605 may only be used along the bottom edge of the tongue 600, or may only be used along the side edges of the tongue 600.

In order to stitch the tongue 600 to the waterproof upper component 100, the stitching 605 may go through an entirety of the waterproof upper component 100 and, as such, may puncture the waterproof layer 115 of the waterproof upper component 100. As noted previously, puncturing of the waterproof layer 115, regardless of the extent of puncture, may result in compromised waterproofing of the waterproof upper component 100. To restore/maintain the waterproof integrity of the waterproof upper component 100, a waterproof material 610 may be used. For example, the waterproof layer 610 may be or include polyurethane, thermoplastic polyurethane, polyester, polytetrafluoroethylene, polyamide, or a combination of any two or more thereof.

As illustrated in FIG. 6, the waterproof material 610 may be sized to cover the entirety of the stitching 605, and may cover a portion of the waterproof upper component 100 and a lower portion of the tongue 600.

The waterproof material 610 may be applied to an inner side of the waterproof upper component 100, and more particularly the layer of textile 120 thereof. The waterproof material 610 may include first and second sides. The first side may be coupled to a layer of mesh, which may be configured in all the various manners as may be the layer of mesh 110. The second side may have an adhesive applied thereto. The adhesive may be any adhesive capable of adhering to the second side of the waterproof material 610, the tongue 600, and the waterproof upper component 100, and more particularly the layer of textile 120 thereof. In some embodiments, the adhesive may be a heat-activated adhesive. In embodiments where the adhesive is a heat-activated adhesive, hot pressing may be used to thermally activate and adhere the heat-activated adhesive to both the inner side of the waterproof upper component 100 (e.g., the layer of textile 120), and optionally the tongue 600. In some embodiments, the adhesive may be positioned on only a portion of the waterproof material 505 corresponding to the stitching 605 used to couple the tongue 600 to the waterproof upper component 100.

Figure 7:
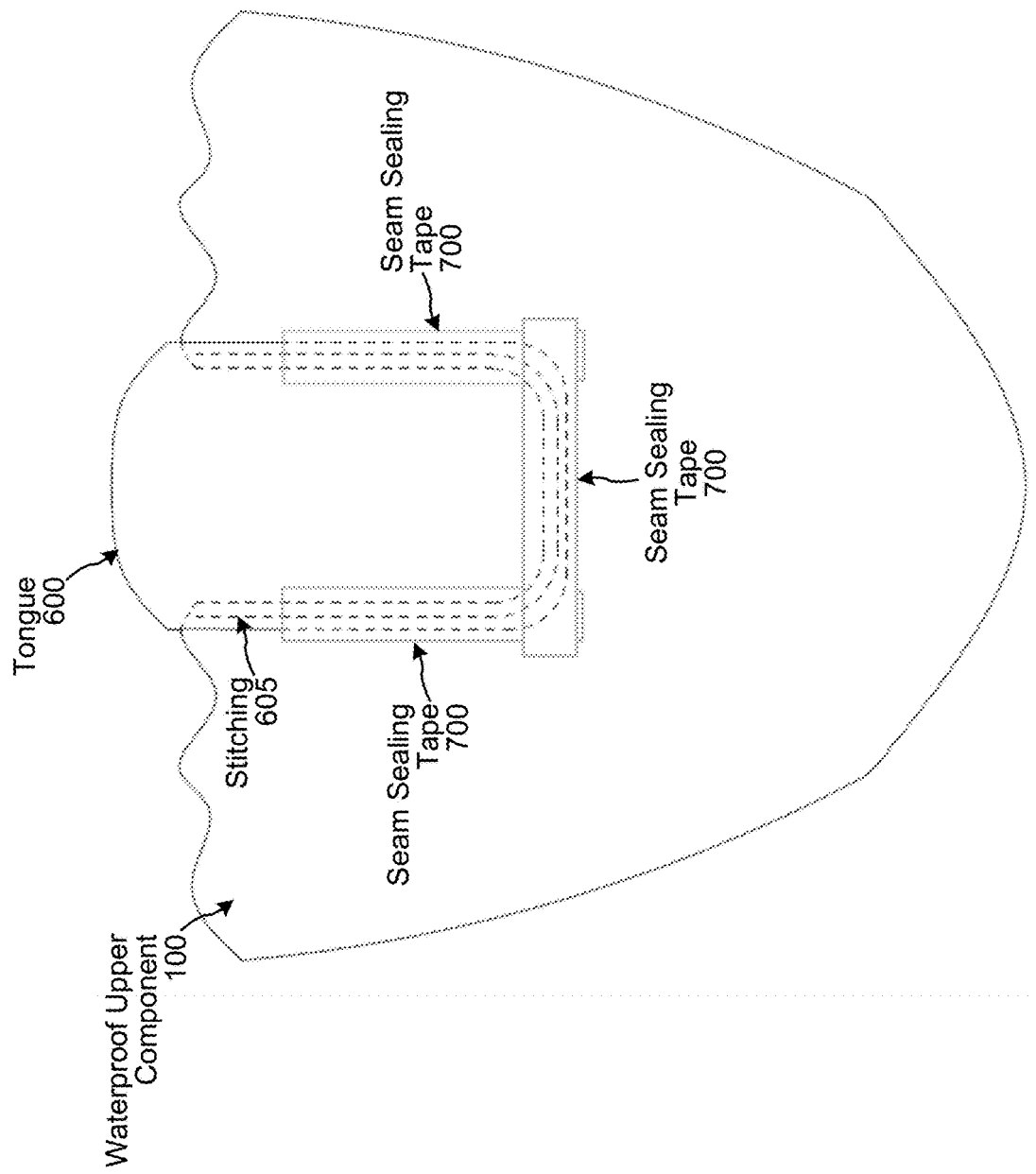
FIG. 7 is a top-planar view of a tongue coupled to a waterproof upper component using stitching, where waterproofing of the upper component is maintained using seam sealing tape.

FIG. 7 provides an alternative technique for restoring/maintaining the waterproof integrity of the waterproof upper component 100 after the tongue 600 is stitched thereto. As illustrated in FIG. 7, seam sealing tape 700 may be applied to the inner surface of the tongue 600 and upper component 100 in order to cover the stitching 605 used to couple the tongue 600 to the waterproof upper component 100 and which is exposed on the inner side of the waterproof upper component 100 (i.e., the surface of the waterproof upper component 100 that will form an interior surface of a corresponding shoe).

In at least some embodiments, the tongue 600 may be attached to the waterproof upper component 100, and the waterproof upper component 100 may be re-waterproofed as described above, prior to coupling heel portions, of the waterproof upper component 100, together.

Attaching Vamp Lining to Waterproof Upper Component

The present disclosure also provides techniques for attaching a vamp lining to the waterproof upper component 100 while maintaining the waterproof integrity of the waterproof upper component 100.

As noted herein above, the vamp is the front part of the upper component starting behind the toe and extending towards the back of the upper component. Thus, as used herein, a "vamp lining" is material that is attached to a portion or entirety of the vamp.

Figure 8:
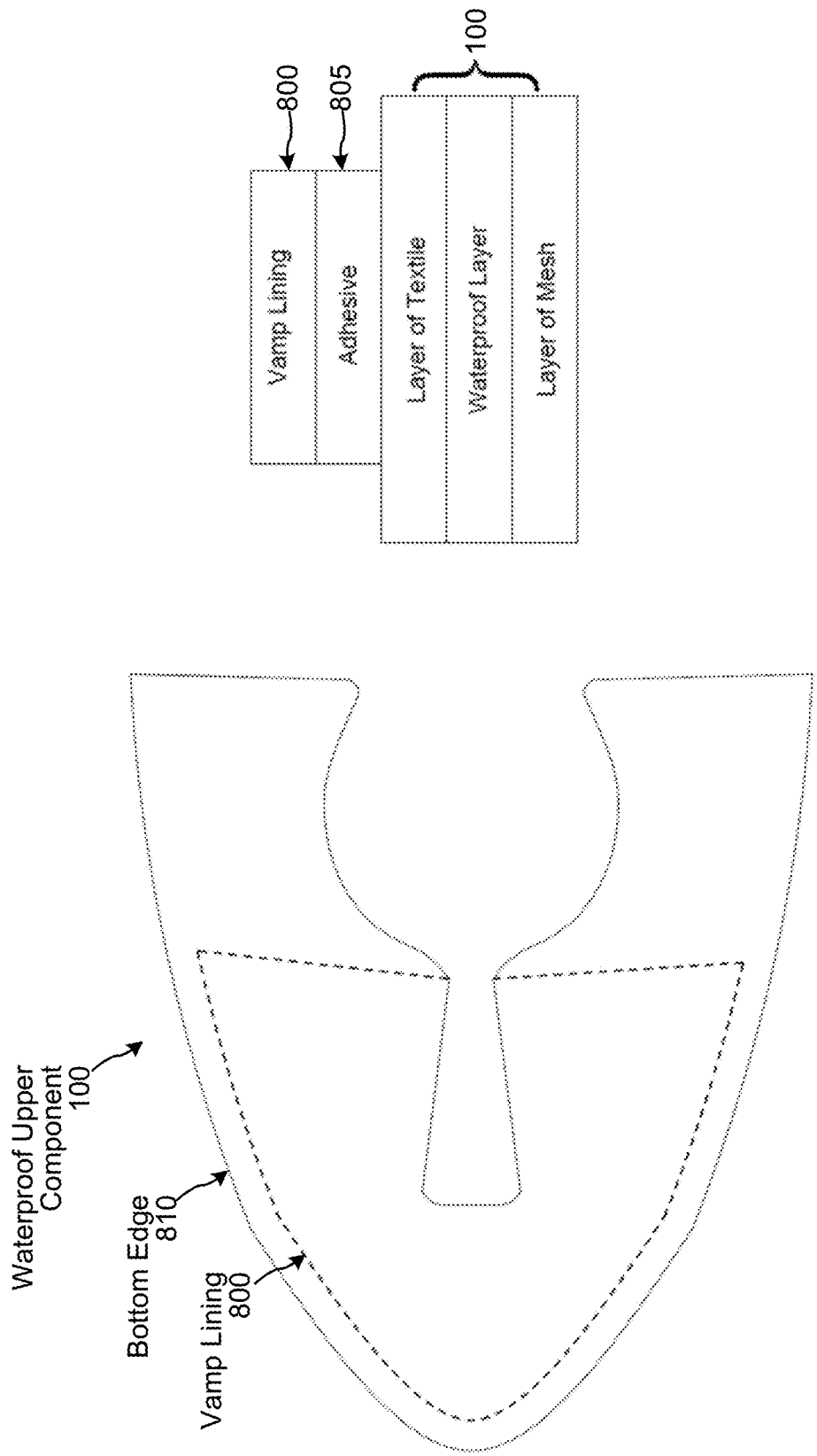
FIG. 8 includes top-planar and cross-section views of a waterproof upper component having a vamp lining coupled thereto.

FIG. 8 shows the waterproof upper component 100 having a vamp lining 800 attached to an inner surface thereof (i.e., the surface of the waterproof upper component 100 to form an inner surface of the corresponding shoe (e.g., the layer of textile 120)). The present disclosure is not intended to be limited to any particular material(s) and/or shape(s) of vamp lining 800. Any vamp lining 800 known to one skilled in the art or not yet discovered is within the scope of the present disclosure. Notwithstanding, example vamp lining materials include mesh and synthetic leather.

In order to maintain the waterproof integrity of the waterproof upper component 100, in some embodiments the vamp lining 800 may be applied to the waterproof upper component 100 using an adhesive 805. For example, the vamp lining 800 may have a first side/surface and a second/side surface. The first side/surface may have the adhesive 805 applied thereto. The adhesive 805 may be any adhesive capable of adhering to the first side/surface of the vamp lining 800 and the inner surface of the waterproof upper component 100 (e.g., the layer of textile 120). In some embodiments, the adhesive 805 may be a heat-activated adhesive. In embodiments where the adhesive 805 is a heat-activated adhesive, hot pressing may be used to thermally activate and adhere the heat-activated adhesive to both the vamp lining 800 and the inner surface of the waterproof upper component 100 (e.g., the layer of textile 120).

As described in detail herein below, a bottom portion of the waterproof upper component 100 may be coupled to a waterproof gasket to form a waterproof shoe. To facilitate this, the vamp lining 800 may be sized to not extend entirely to a bottom edge 810 of the waterproof upper component 100. Different techniques may be used to couple the bottom portion of the waterproof upper component 100 to a waterproof gasket. The present disclosure is not intended to be limited to a single, particular distance between the vamp lining 800 and the bottom edge 810 of the waterproof upper component 100, as the distance may be dependent on the technique used to couple the bottom portion of the waterproof upper component 100 to a waterproof gasket. In some embodiments, the vamp lining 800 may be sized such that it falls short of extending to the bottom edge 810 by a plurality of millimeters (mm). In some embodiments, the vamp lining 800 may be sized such that it falls short of extending to the bottom edge 810 by 10 mm.

In at least some embodiments, the vamp lining 100 may be attached to the waterproof upper component 100 prior to coupling heel portions, of the waterproof upper component 100, together.

Attaching Heel Portions of Waterproof Upper Components Together

The present disclosure further provides techniques for coupling heel portions, of the waterproof upper component 100, together while maintaining the waterproof integrity of the waterproof upper component 100. With reference to FIG. 8, the heel portions are the rightmost portions of the planar of the waterproof upper component 100.

Figure 9:
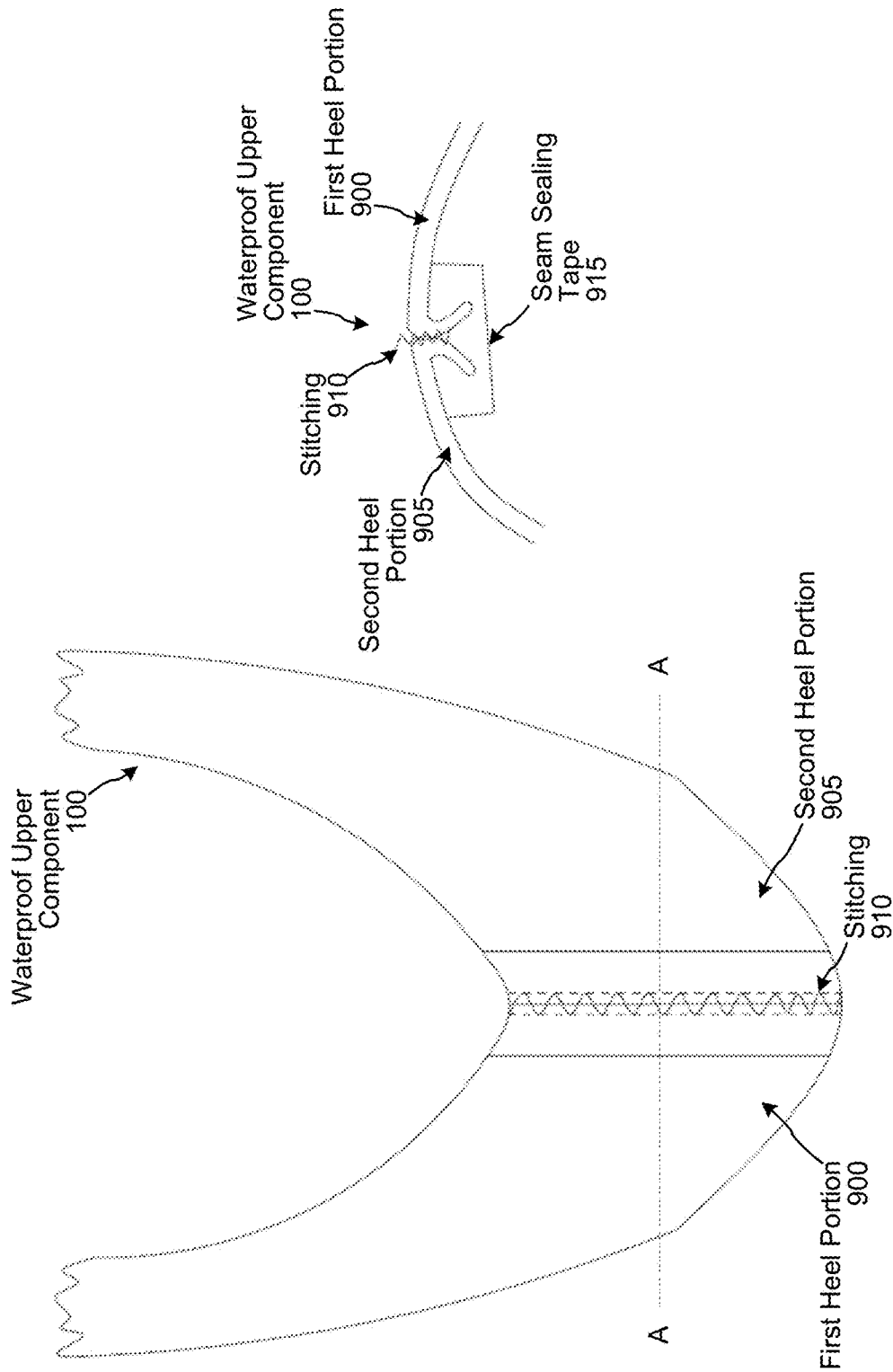
FIG. 9 includes perspective and cross-section (taken along line A-A) views of heel portions of a waterproof upper component coupled together.

In some embodiments, the first heel portion 900 may be coupled to the second heel portion 905 using stitching 910. FIG. 9 shows an example in which roll stitching is used. However, it is noted that other stitching techniques for coupling the heel portions 900/905 of the are known to one skilled in the art and within the scope of the present disclosure.

In order to stitch the heel portions 900/905 together, the stitching 910 may puncture the waterproof layer 115 of the waterproof upper component 100. As noted previously, puncturing of the waterproof layer 115, regardless of the extent of puncture, may result in compromised waterproofing of the waterproof upper component 100. To restore/maintain the waterproof integrity of the waterproof upper component 100, seam sealing tape 915 may be applied to the inner surface of upper component 100 (e.g., the layer of textile 120) in order to cover the stitching 910 used to couple the heel portions 900/905 together.

As another example, the heel portions 900/905 may be coupled together using an adhesive. When using an adhesive, in some embodiments seam sealing tape may be applied to the inner surface of the upper component 110 in order to cover the adhesive.

In at least some embodiments, the heel portions 900/905 may be coupled together after the tongue 600 is coupled to the waterproof upper component 100.

Attaching Collar Lining to Waterproof Upper Component

The present disclosure further provides techniques for attaching a collar lining to the waterproof upper component 100.

Figure 10:
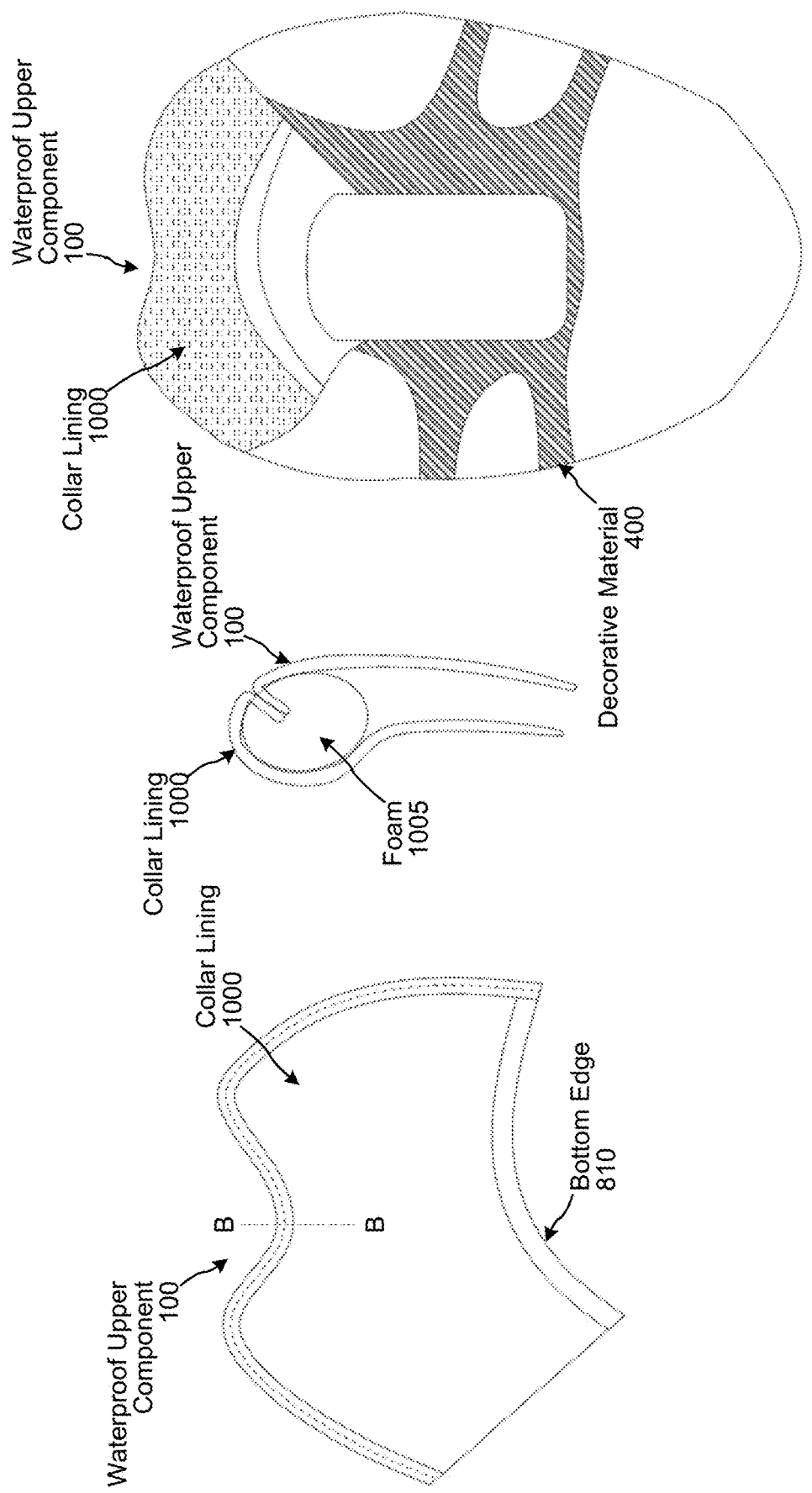
FIG. 10 illustrates coupling of a collar lining to a waterproof upper component. The left of FIG. 10 is a front-planar vies of the collar lining coupled to the waterproof upper component. The middle of FIG. 10 is a cross-section (taken along line B-B) view of the collar lining coupled to the waterproof upper component. The right of FIG. 10 is a front-perspective view of the collar lining coupled to the waterproof upper component.

With reference to FIG. 10, an edge of a collar lining 1000 may be coupled to an upper edge of the waterproof upper component 100. For example, the edge of the collar lining 1000 may be coupled to the upper edge of the waterproof upper component 100 using stitching. For example, roll stitching may be used.

After coupling the edge of the collar lining 1000 to the upper edge of the waterproof upper component 100, foam 1005 may be placed along the coupled edge of the collar lining 100 and upper edge of the waterproof upper component 100. Thereafter, the collar lining 1000 may be folded over the foam 1005 to form a "collar." In some embodiments, the collar lining 1000 may be adhered to an inner surface of the waterproof upper component 100 (e.g., the layer of textile 120) after the collar is formed.

As described in detail herein below, a bottom portion of the waterproof upper component 100 may be coupled to a waterproof gasket to form a waterproof shoe. To facilitate this, the collar lining 1000 may be sized to not extend entirely to the bottom edge 810 of the waterproof upper component 100. Different techniques may be used to couple the bottom portion of the waterproof upper component 100 to a waterproof gasket. The present disclosure is not intended to be limited to a single, particular distance between the collar lining 1000 and the bottom edge 810 of the waterproof upper component 100, as the distance may be dependent on the technique used to couple the bottom portion of the waterproof upper component 100 to a waterproof gasket. In some embodiments, the collar lining 1000 may be sized such that it falls short of extending to the bottom edge 810 by a plurality of millimeters (mm). In some embodiments, the collar lining 1000 may be sized such that it falls short of extending to the bottom edge 810 by 10 mm.

Waterproof Gaskets

A waterproof gasket may be used in making a waterproof shoe in accordance with various embodiments of the present disclosure. In some embodiments, the waterproof gasket may include a layer of non-woven material and a waterproof layer. For example, the layer of non-woven material may be or include polyester, nylon, cotton, paper, or a combination of any two or more thereof. For example, the waterproof layer may be or include polyurethane, thermoplastic polyurethane, polyester, polytetrafluoroethylene, polyamide, or a combination of any two or more thereof.

A waterproof shoe of the present disclosure may be configured such that the layer of non-woven, of the waterproof gasket, faces an inner portion of the waterproof upper component 100 (i.e., an inner portion of the waterproof shoe), and the waterproof layer is a bottom most layer of the waterproof gasket when the waterproof shoe is fully assembled.

Attaching Waterproof Gasket to Upper Component

The present disclosure also provides techniques for attaching a waterproof gasket to the waterproof upper component 100 while maintaining the waterproof integrity of the waterproof gasket and the waterproof upper component 100.

In some embodiments, coupling of the waterproof gasket to the waterproof upper component 100 may include use of a lasting machine. The present disclosure is not to be limited to use of any particular lasting machine. Rather, the present disclosure envisions uses of any lasting machine that is capable of performing the herein described processes.

Figure 11:
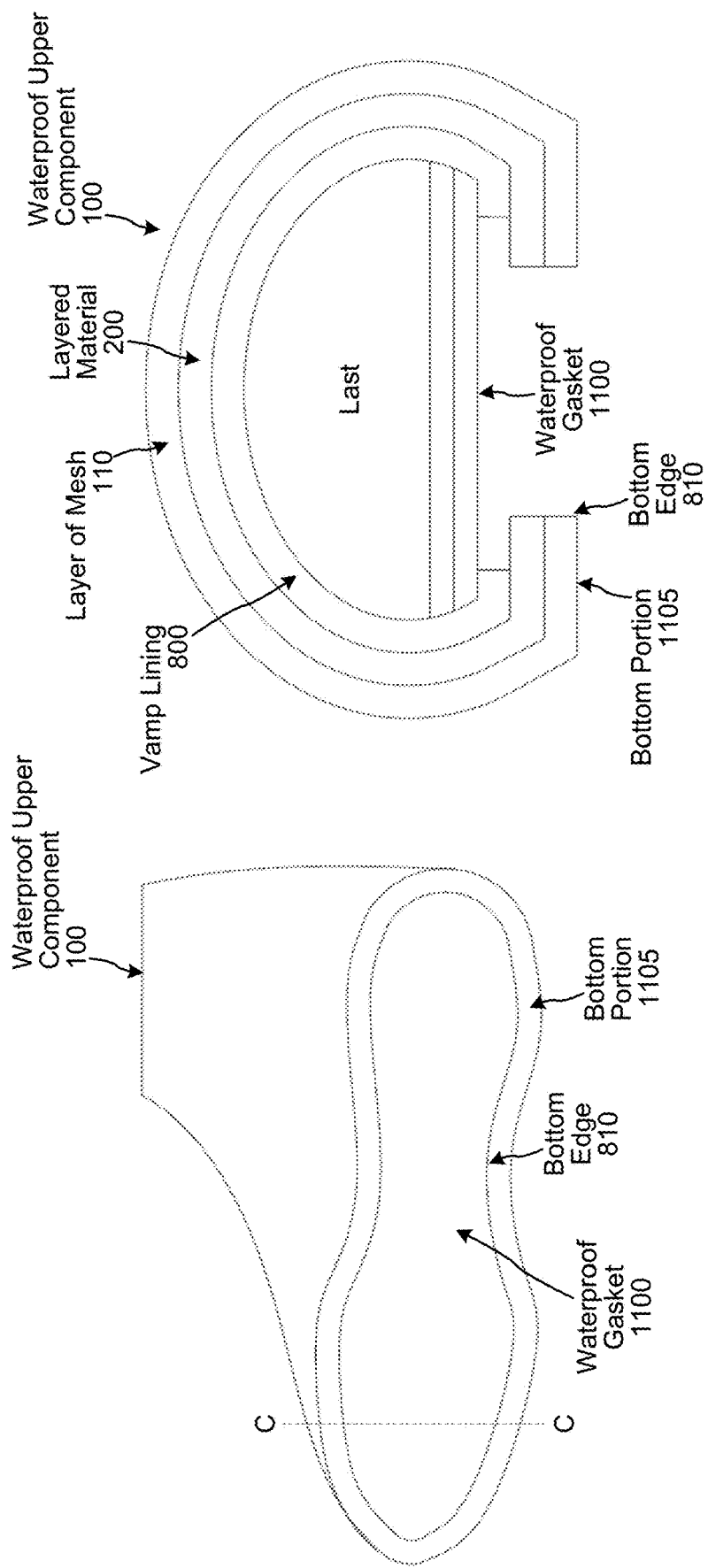
FIG. 11 includes bottom-perspective and cross-section (taken along line C-C) views of a waterproof gasket coupled to a waterproof upper component.

With reference to FIG. 11, a waterproof gasket 1100 may be removably attached (e.g., using an adhesive) to the bottom of a last. More particularly, the layer of non-woven material, of the waterproof gasket 1100, may be removably coupled to the bottom of the last.

Prior to or after removably attaching the waterproof gasket 1100 to the last, the waterproof upper component 100 may be positioned around the last. More particularly, the inner surface of the waterproof upper component 100 (e.g., the layer of textile 120) may be positioned on the last.

As discussed previously, the vamp lining 800 and the collar lining 1000, and potentially other materials, may be attached to the waterproof upper component 100 in a manner in which the vamp lining 800 and the collar lining 1000, and potentially other materials, do not extend all the way to the bottom edge 810 of the waterproof upper component 100. This results in a bottom portion 1105 of the waterproof upper component 100 not having any material attached thereto.

Consequently, as shown in FIG. 11, the bottom portion 1105, not having any material attached thereto, may be folded over and coupled to an edge portion of the waterproof gasket 1100 removably attached to the last. For example and more particularly, the layer of textile 120, of the waterproof upper component 100, may be coupled to the layer of non-woven material of the waterproof gasket 1100.

In at least some embodiments, coupling of the waterproof gasket 1100 to the bottom portion 1105 of the waterproof upper component 100 may occur after coupling the collar lining 1000 to the waterproof upper component 100.

In some embodiments, as illustrated in FIG. 11, the vamp lining 800 and/or the collar lining 1000 may be sized such that a portion thereof may be folded and contact a bottom surface of the waterproof gasket 1100 while still permitting the bottom portion 1105, not having material attached thereto, to be attached to the bottom surface of the waterproof gasket 1100.

In order to maintain the waterproof integrity of the waterproof upper component 100 and the waterproof gasket 1100, in some embodiments the waterproof upper component 100 may be coupled to the waterproof gasket 1100 using an adhesive. In some embodiments, the adhesive may be first placed on the waterproof gasket 1100, and more particularly the portion of the waterproof gasket 1100 that is to be coupled to the waterproof upper component 100. The adhesive may be any adhesive capable of adhering to the waterproof gasket 1100 (e.g., the waterproof layer thereof) and the inner surface of the waterproof upper component 100 (e.g., the layer of textile 120). In some embodiments, the adhesive may be a heat-activated adhesive. In embodiments where the adhesive is a heat-activated adhesive, hot pressing may be used to thermally activate and adhere the heat-activated adhesive to both the waterproof gasket 1100 (e.g., the waterproof layer thereof) and the inner surface of the waterproof upper component 100 (e.g., the layer of textile 120).

Attaching Waterproof Gasket to Upper Component

The present disclosure also provides for coupling an outsole to the coupled waterproof gasket 1100 and upper component 100. The outsole may be coupled to the waterproof gasket 1100 and/or the waterproof upper component 100. For example, an adhesive may be placed on the upper component 100 (which may still be located on the last at this point in time), and machine may be used to couple the outsole to the upper component 100 using the adhesive. As another example, the upper component 100 (still located on the last) may be put in a mold, and polyurethane, rubber, or some other outsole material may be injected into the mold and cured.

Equivalents

Although several aspects of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize, or be able to ascertain using no more than routine experimentation, many equivalents to the specific aspects of the disclosure described herein. It is, therefore, to be understood that the foregoing aspects are presented by way of example only and that, within the scope of the appended claims and equivalents thereto; the disclosure may be practiced otherwise than as specifically described and claimed. The present disclosure is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated by reference in their entirety herein.

What is claimed is:

1. A method for making a waterproof shoe, the method comprising:
    providing a waterproof upper component having a minimum of three layers, the waterproof upper component comprising:
        a waterproof layer positioned between and attached to a layer of mesh and a layer of textile; and
        first and second heel portions;
    coupling a tongue to the waterproof upper component;
    after providing the waterproof upper component, coupling the first and second heel portions, of the waterproof upper component, together;
    after coupling the first and second heel portions together, coupling a collar lining to the waterproof upper component;
    after coupling the first and second heel portions together, coupling a waterproof gasket to a bottom portion of the waterproof upper component; and
    after coupling the waterproof gasket to the bottom portion of the waterproof upper component, coupling an outsole to at least one of the waterproof gasket and the waterproof upper component.

2. The method of claim 1, further comprising:
    prior to coupling the first and second heel portions together, coupling a decorative material to the layer of mesh of the waterproof upper component using stitching; and
    placing seam sealing tape on the layer of textile, of the waterproof upper component, to cover stitching on an inner side of the waterproof upper component.

3. The method of claim 1, wherein coupling the tongue to the waterproof upper component comprises use of stitching and the method further comprises using a waterproof material to cover the stitching used to couple the tongue to the waterproof upper component, wherein the waterproof material is applied to an inner side of the waterproof upper component.

4. The method of claim 3, wherein the waterproof material comprises a waterproof layer having two sides, wherein a first side of the waterproof layer is coupled to a layer of mesh, and a second side of the waterproof layer has an adhesive applied thereto.

5. The method of claim 4, wherein:
    the adhesive is a heat-activated adhesive; and
    using the waterproof material comprises hot pressing the waterproof material to the inner side of the waterproof upper component.

6. The method of claim 1, wherein coupling the tongue to the waterproof upper component comprises use of stitching and the method further comprises applying seam sealing tape to cover the stitching used to couple the tongue to the waterproof upper component, wherein the seam sealing tape is applied to an inner side of the waterproof upper component.

7. The method of claim 1, further comprising applying a vamp lining to an inner surface of the waterproof upper component, wherein the vamp lining does not extend to a bottom edge of the waterproof upper component, thereby enabling a bottom portion, of the waterproof upper component, to be coupled to the waterproof gasket.

8. The method of claim 7, wherein the vamp lining is positioned at least 10 mm away from the bottom edge of the waterproof upper component.

9. The method of claim 1, wherein coupling the first and second heel portions, of the waterproof upper component, together occurs after coupling the tongue to the waterproof upper component.

10. The method of claim 1, wherein coupling the first and second heel portions, of the waterproof upper component, together comprises use of stitching and the method further comprises applying seam sealing tape to cover the stitching used to couple the first and second heel portions of the waterproof upper component, together, wherein the seam sealing tape is applied to an inner side of the waterproof upper component.

11. The method of claim 1, wherein:
    the waterproof gasket comprises a layer of non-woven material and a waterproof layer;
    the layer of non-woven material faces an inner portion of the waterproof upper component; and
    coupling the waterproof gasket to the bottom portion of the waterproof upper component comprises coupling the layer of textile, of the waterproof upper component, to the waterproof layer of the waterproof gasket.

12. The method of claim 1, wherein coupling the waterproof gasket to the bottom portion of the waterproof upper component occurs after coupling the collar lining to the waterproof upper component.

13. The method of claim 1, wherein coupling the waterproof gasket to the bottom portion of the waterproof upper component comprises use of an adhesive.

14. The method of claim 13, wherein the adhesive is a heat-activated adhesive.

15. The method of claim 1, wherein coupling the waterproof gasket to the bottom portion of the waterproof upper component comprises use of a lasting machine.

16. The method of claim 1, wherein the layer of mesh, of the waterproof upper component, is pre-treated with a water repellant.

17. The method of claim 1, wherein the layer of mesh, of the waterproof upper component, comprises non-wicking mesh.

18. The method of claim 1, wherein the layer of textile, of the waterproof upper component, comprises knitted fabric.

19. The method of claim 18, wherein the knitted fabric comprises nylon, wool, rayon, silk, cotton, polyester, or a combination thereof.

20. The method of claim 18, wherein the knitted fabric comprises non-wicking knitted fabric.

21. The method of claim 1, wherein the layer of textile, of the waterproof upper component, comprises a leather, a synthetic leather, or a combination thereof.

22. The method of claim 1, further comprising, prior to coupling the first and second heel portions together, coupling a decorative material to the layer of mesh of the waterproof upper component.

23. The method of claim 22, wherein the decorative material comprises thermoplastic polyurethane (TPU) fabric.

24. The method of claim 22, wherein the decorative material is coupled to the layer of mesh using an adhesive.

25. The method of claim 24, wherein:
the adhesive is a heat-activated adhesive; and
coupling the decorative material to the layer of mesh comprises hot pressing the decorative material to the layer of mesh.

26. The method of claim 1, wherein coupling the tongue to the waterproof upper component comprises use of stitching.

27. The method of claim 1, further comprising applying a vamp lining to an inner surface of the waterproof upper component.

28. The method of claim 27, wherein the vamp lining is applied prior to coupling the first and second heel portions together.

29. The method of claim 27, wherein the vamp lining comprises mesh, synthetic leather, or a combination thereof.

30. The method of claim 1, wherein coupling the first and second heel portions, of the waterproof upper component, together comprises use of stitching.

* * * * *